(12) United States Patent
Yang et al.

(10) Patent No.: US 11,758,236 B2
(45) Date of Patent: *Sep. 12, 2023

(54) CONTROL METHOD FOR FOCUS MOVEMENT ON EPG USER INTERFACE, AND DISPLAY DEVICE

(71) Applicant: Hisense Visual Technology Co., Ltd., Shandong (CN)

(72) Inventors: Cheng Yang, Shandong (CN); Mengyuan Li, Shandong (CN)

(73) Assignee: Hisense Visual Technology Co., Ltd., Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,280

(22) Filed: Nov. 2, 2021

(65) Prior Publication Data
US 2022/0060796 A1    Feb. 24, 2022

Related U.S. Application Data

(63) Continuation of application No. 16/990,673, filed on Aug. 11, 2020, now Pat. No. 11,212,588, which is a
(Continued)

(30) Foreign Application Priority Data

Jun. 20, 2018  (CN) .......................... 201810638954.3
Jun. 20, 2018  (CN) .......................... 201810638978.9
(Continued)

(51) Int. Cl.
H04N 21/482   (2011.01)
G06F 3/0482   (2013.01)
G06F 3/0485   (2022.01)
H04N 21/44    (2011.01)
H04N 21/472   (2011.01)

(52) U.S. Cl.
CPC ....... H04N 21/4821 (2013.01); G06F 3/0482 (2013.01); G06F 3/0485 (2013.01); H04N 21/44016 (2013.01); H04N 21/472 (2013.01)

(58) Field of Classification Search
CPC ......... H04N 21/4821; H04N 21/44016; H04N 21/472; H04N 5/445; G06F 3/0482; G06F 3/0485; G06F 3/04847; G06F 3/04842
See application file for complete search history.

(56) References Cited

U.S. PATENT DOCUMENTS 5,850,218 A * 12/1998 LaJoie ................... H04N 7/165
                                                    348/E7.071
6,735,777 B1    5/2004 Kim
(Continued)

FOREIGN PATENT DOCUMENTS

CN      1620123      5/2005
CN    101026702      8/2007
(Continued)

OTHER PUBLICATIONS

European Seach dated Feb. 11, 2022, issued in Serial No. EP 19822725.8.
(Continued)

*Primary Examiner* — Fernando Alcon
(74) *Attorney, Agent, or Firm* — Workman Nydegger

(57) ABSTRACT

Disclosed are a control method for focus movement on an EPG user interface and a display device. The method includes: displaying a television broadcast program on a display screen; receiving an instruction for displaying an EPG user interface, and displaying the EPG user interface on the display screen in response to the instruction; and receiving an instruction for indicating the movement of a focus along a channel arrangement direction in the EPG user interface, and in response to the instruction, determining a new position to which the focus moves in a target television
(Continued)

channel according to the position of a pre-selected reference broadcast program, so as to control the focus to move to a target broadcast program corresponding to the new position.

14 Claims, 20 Drawing Sheets

Related U.S. Application Data continuation of application No. PCT/CN2019/091911, filed on Jun. 19, 2019.

(30) Foreign Application Priority Data

Jun. 20, 2018 (CN) .......................... 201810639818.6
Jun. 20, 2018 (CN) .......................... 201810639819.0

(56) References Cited

U.S. PATENT DOCUMENTS

| | | | |
|---|---|---|---|
| 9,800,933 B1 | 10/2017 | Strothmann et al. | |
| 2004/0250280 A1* | 12/2004 | Allport | H04N 21/47 725/39 |
| 2005/0102634 A1* | 5/2005 | Sloo | H04N 21/4438 715/810 |
| 2005/0229210 A1* | 10/2005 | Akhavan | H04N 21/488 348/565 |
| 2007/0100915 A1 | 5/2007 | Rose et al. | |
| 2009/0113473 A1* | 4/2009 | Stalker | C03C 3/064 725/39 |
| 2010/0275231 A1 | 10/2010 | Yi et al. | |
| 2013/0212624 A1 | 8/2013 | Okada | |
| 2013/0347037 A1* | 12/2013 | Soroushian | H04N 21/26258 725/39 |
| 2014/0245144 A1* | 8/2014 | Korbecki | H04N 21/4821 715/716 |
| 2016/0124917 A1* | 5/2016 | Ducat | G06F 8/38 715/760 |

FOREIGN PATENT DOCUMENTS

| | | |
|---|---|---|
| CN | 101052114 | 10/2007 |
| CN | 101577797 | 11/2009 |
| CN | 102036119 | 4/2011 |
| CN | 102375688 | 3/2012 |
| CN | 102402601 | 4/2012 |
| CN | 103197835 | 7/2013 |
| CN | 103414946 | 11/2013 |
| CN | 103428562 | 12/2013 |
| CN | 103916710 | 7/2014 |
| CN | 104104984 | 10/2014 |
| CN | 106341717 | 1/2017 |
| CN | 106454476 | 2/2017 |
| CN | 107529081 | 12/2017 |
| CN | 107801105 | 3/2018 |
| CN | 108810647 | 11/2018 |
| CN | 108833988 | 11/2018 |
| EP | 0903938 | 3/1999 |
| EP | 2112824 A2 | 10/2009 |
| EP | 2302915 A2 | 3/2011 |
| WO | 2009069975 | 6/2009 |
| WO | 2013167057 | 11/2013 |
| WO | 2014036937 | 3/2014 |

OTHER PUBLICATIONS

Office Action from Chinese Application No. 201810638954.3 dated Apr. 2, 2020 (8 pages).
Office Action from Chinese Application No. 201810638978.9 dated Sep. 30, 2019 (8paqes).
Office Action from Chinese Application No. 201810638978.9 dated Jun. 10, 2020 (6 pages).
Office Action from Chinese Application No. 201810639818.6 dated Mar. 18, 2020 (8 pages).
Office Action from Chinese Application No. 201810639818.6 dated Sep. 3, 2020 (4paqes).
Office Action from Chinese Application No. 201810639819.0 dated May 8, 2020 (9 pages).

* cited by examiner

| Guide | Dc a a2 29/3 4:19PM-29/3 5:19PM Brief Introduction of the content: XXXXXXXXXXXXXXXX | | | | | |
|---|---|---|---|---|---|---|
| DC a | | | | | | |
| Line | Present time 3:00PM 3:50PM | | Today 4:00PM | | Today 5:00PM | |
| 1、DC a | a0 | a1 | a2 | | a3 | |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

| Guide | Dc a a2 29/3 4:19PM-29/3 5:19PM Brief Introduction of the content: XXXXXXXXXXXXXXX | | |
|---|---|---|---|
| DC a | Present time 3:00PM | Today 4:00PM | Today 5:00PM ▷ |
| Line | | | |
| 1、DC a | a0 | a1 | a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2B

| Guide | Dc a a2 29/3 4:19PM-29/3 5:19PM Brief Introduction of the content: XXXXXXXXXXXXXXX | | |
|---|---|---|---|
| DC a | Present time 3:00PM | Today 4:00PM | Today 5:00PM ▷ |
| Line | | | |
| 1、DC a | a0 | a1 | a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2C

| Guide | Dc a a2 29/3 4:19PM-29/3 5:19PM Brief Introduction of the content: XXXXXXXXXXXXXXX ||||||
|---|---|---|---|---|---|---|
| DC a | | | | | | |
| Line | Present time 3:00PM || Today 4:00PM || Today 5:00PM ▷ ||
| 1、DC a | a0 || a1 | a2 | a3 ||
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2D

| Guide | Dc a a2 29/3 4:19PM-29/3 5:19PM Brief Introduction of the content: XXXXXXXXXXXXXXX ||||||
|---|---|---|---|---|---|---|
| DC a | | | | | | |
| Line | Present time 3:00PM || Today 4:00PM || Today 5:00PM ▷ ||
| 1、DC a | a0 || a1 | a2 | a3 ||
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2E

| Guide | Dc a a2 29/3 4:19PM-29/3 5:19PM Brief Introduction of the content: XXXXXXXXXXXXXXX | | | | | |
|---|---|---|---|---|---|---|
| DC a | | | | | | |
| Line | Present time 3:00PM | | Today 4:00PM | | Today 5:00PM ▷ | |
| 1、DC a | a0 | | a1 | a2 | a3 | |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2F

| Guide | Dc a a2 29/3 4:19PM-29/3 5:19PM Brief Introduction of the content: XXXXXXXXXXXXXXX | | | | | |
|---|---|---|---|---|---|---|
| DC a | | | | | | |
| Line | Present time 3:00PM | | Today 4:00PM | | Today 5:00PM ▷ | |
| 1、DC a | a0 | | a1 | a2 | a3 | |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2G

| Guide | Dc a a2 29/3 4:19PM-29/35:19PM Brief Introduction of the content: XXXXXXXXXXXXXXX | | | |
|---|---|---|---|---|
| DC a | | | | |
| Line | Present time 3:00PM | Today 4:00PM | Today 5:00PM ▷ | |
| 1、DC a | a0 | a1 | a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2H

| Guide | Dc a a2 29/3 4:19PM-29/35:19PM Brief Introduction of the content: XXXXXXXXXXXXXXX | | | |
|---|---|---|---|---|
| DC a | | | | |
| Line | Present time 3:00PM | Today 4:00PM | Today 5:00PM ▷ | |
| 1、DC a | a0 | a1 | a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2I

| Guide | Dc a<br>a2<br>29/3 4:19PM-29/35:19PM<br>Brief Introduction of the content: XXXXXXXXXXXXXXX | | |
|---|---|---|---|
| DC a | Present time<br>3:00PM | Today<br>4:00PM | Today<br>5:00PM |
| Line | | | |
| 1、DC a | a0 | a1 | a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 2J

| Guide | Dc a a2 29/3 4:19PM-29/35:19PM Brief Introduction of the content: XXXXXXXXXXXXXXX | | | | | |
|---|---|---|---|---|---|---|
| DC a | | | | | | |
| Line | Present time 3:00PM 3:50PM | | Today 4:00PM | | Today 5:00PM ▷ | |
| 1、DC a | a0 | a1 | | a2 | | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | e4 | e5 | e6 | e7 |

Fig. 4

| Guide | Dc a a2 29/3 4:19PM-29/35:19PM Brief Introduction of the content: XXXXXXXXXXXXXXX | | | | | |
|---|---|---|---|---|---|---|
| DC a | | | | | | |
| Line | Present time 3:00PM | | Today 4:00PM | | Today 5:00PM ▷ | |
| 1、DC a | a0 | b11 a1 b12 | | a2 | | a3 |
| 2、DC b | b0 | b1 | | b2 | b3 | b4 | b5 |
| 3、DC c | c0 | c1 | | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 5A

| Guide | Dc a a2 29/3 4:19PM-29/35:19PM Brief Introduction of the content: XXXXXXXXXXXXXXX ||||||
|---|---|---|---|---|---|---|
| DC a ||||||||
| Line | Present time 3:00PM || Today 4:00PM || Today 5:00PM ▷ ||
| 1、DC a | a0 || a1 | a2 || a3 |
| 2、DC b | b0 | b1 $c11$ | $c12$ b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 5B

| Guide | Dc a a2 29/3 4:19PM-29/35:19PM Brief Introduction of the content: XXXXXXXXXXXXXXX ||||||
|---|---|---|---|---|---|---|
| DC a ||||||||
| Line | Present time 3:00PM || Today 4:00PM || Today 5:00PM ▷ ||
| 1、DC a | a0 || a1 | a2 || a3 |
| 2、DC b | b0 | b1 | b2 | b3 | b4 | b5 |
| 3、DC c | c0 | c1 $d11$ $d12$ $d13$ | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 5C

| Guide | Dc a a2 29/3 4:19PM-29/35:19PM Brief Introduction of the content: XXXXXXXXXXXXXXX | | | | | |
|---|---|---|---|---|---|---|
| DC a Line | Present time 3:00PM | | Today 4:00PM | | Today 5:00PM | |
| 1、DC a | a0 | | a1 | a2 | | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | e11 d2 e12 | d3 | ... | d5 | ... | d8 |
| 5、DC e | ... | e2 | e3 | ... | e5 | e6 | e7 |

Fig. 5D

| Guide | Dc a a2 29/3 4:19PM-29/35:19PM Brief Introduction of the content: XXXXXXXXXXXXXXX | | | | | |
|---|---|---|---|---|---|---|
| DC a Line | Present time 3:00PM | | Today 4:00PM | | Today 5:00PM | |
| 1、DC a | a0 | | a1 | a2 | | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 5E

| Guide | Dc a a2 29/3 4:19PM-29/35:19PM Brief Introduction of the content: XXXXXXXXXXXXXXX | | | | | |
|---|---|---|---|---|---|---|
| DC a | | | | | | |
| Line | Present time 3:00PM | | Today 4:00PM | | Today 5:00PM | ▷ |
| 1、DC a | a0 | | a1 | a2 | | a3 |
| 2、DC b | b0 | b1 | b2 | b3 | b4 | b5 |
| 3、DC c | c0 | c1 | | c2 | c3 | c4 | c5 | c6 |
| 4、DC d | d0 | d1 | d2 | d3 | ... | d5 | ... | d8 |
| 5、DC e | ... e2 | | e3 | ... | e5 | e6 | e7 |

Fig. 5F

| Guide | Dc a a2 29/3 4:19PM-29/35:19PM Brief Introduction of the content: XXXXXXXXXXXXXXX | | | | | |
|---|---|---|---|---|---|---|
| DC a | | | | | | |
| Line | Present time 3:00PM | | Today 4:00PM | | Today 5:00PM | ▷ |
| 1、DC a | a0 | | a1 | a2 | | a3 |
| 2、DC b | b0 | b1 | b2 | b3 | b4 | b5 |
| 3、DC c | c0 | c1 | | c2 | c3 | c4 | c5 | c6 |
| 4、DC d | d0 | d1 | d2 | d3 | ... | d5 | ... | d8 |
| 5、DC e | ... d11 e2 d12 | e3 | ... | e5 | e6 | e7 |

Fig. 5G

| Guide | Dc a | | | |
|---|---|---|---|---|
| DC a | a2 29/3 4:19PM-29/35:19PM Brief Introduction of the content: XXXXXXXXXXXXXXX | | | |
| Line | Present time 3:00PM | Today 4:00PM | Today 5:00PM ▷ | |
| 1、DC a | a0 | a1 | a2 | a3 |
| 2、DC b | b0 | b1 | b2 | b3 | b4 | b5 |
| 3、DC c | c0 | c1 | c2 | c3 | c4 | c5 | c6 |
| 4、DC d | c11 c12 d0 | d1 | d2 | d3 | ... | d5 | ... | d8 |
| 5、DC e | ... | e2 | e3 | ... | e5 | e6 | e7 |

Fig. 5H

| Guide | Dc a | | | |
|---|---|---|---|---|
| DC a | a2 29/3 4:19PM-29/35:19PM Brief Introduction of the content: XXXXXXXXXXXXXXX | | | |
| Line | Present time 3:00PM | Today 4:00PM | Today 5:00PM ▷ | |
| 1、DC a | a0 | b11 a1 b12 | a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 6A

| Guide | Dc a | | | | | |
|---|---|---|---|---|---|---|
| DC a | a2<br>29/3 4:19PM-29/35:19PM<br>Brief Introduction of the content: XXXXXXXXXXXXXXX | | | | | |
| Line | Present time<br>3:00PM | | Today<br>4:00PM | | Today<br>5:00PM | ▷ |
| 1、DC a | a0 | | a1 | a2 | | a3 |
| 2、DC b | b0 | b1 c11 | c12 b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 6B

| Guide | Dc a | | | | | |
|---|---|---|---|---|---|---|
| DC a | a2<br>29/3 4:19PM-29/35:19PM<br>Brief Introduction of the content: XXXXXXXXXXXXXXX | | | | | |
| Line | Present time<br>3:00PM | | Today<br>4:00PM | | Today<br>5:00PM | ▷ |
| 1、DC a | a0 | | a1 | a2 | | a3 |
| 2、DC b | b0 | b1 | b2 | b3 | b4 | b5 |
| 3、DC c | c0 | c1 d11 d12 d13 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 6C

| Guide | Dc a a2 29/3 4:19PM-29/35:19PM Brief Introduction of the content: XXXXXXXXXXXXXXX ||||||
|---|---|---|---|---|---|---|
| DC a | | | | | | |
| Line | Present time 3:00PM || Today 4:00PM || Today 5:00PM ▷ ||
| 1、DC a | a0 || a1 || a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 ←e11→ ←e12→ | d3 | ... d5 | ... | d8 |
| 5、DC e | ... | e2 | e3 | ... e5 | e6 | e7 |

Fig. 6D

| Guide | Dc a a2 29/3 4:19PM-29/35:19PM Brief Introduction of the content: XXXXXXXXXXXXXXX ||||||
|---|---|---|---|---|---|---|
| DC a | | | | | | |
| Line | Present time 3:00PM | Today 4:00PM || Today 5:00PM ▷ |||
| 1、DC a | a0 | a1 || a2 | a3 ||
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... d5 | ... | d8 |
| 5、DC e | ... | e2 | e3 | ... e5 | e6 | e7 |

Fig. 6E

| Guide | Dc a a2 29/3 4:19PM-29/3 5:19PM Brief Introduction of the content: XXXXXXXXXXXXXXX | | | | |
|---|---|---|---|---|---|
| DC a | | | | | |
| Line | Present time 3:00PM | Today 4:00PM | | Today 5:00PM | ▷ |
| 1、DC a | a0 | a1 | a2 | a3 | |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 6F

| Guide | Dc a a2 29/3 4:19PM-29/3 5:19PM Brief Introduction of the content: XXXXXXXXXXXXXXX | | | | |
|---|---|---|---|---|---|
| DC a | | | | | |
| Line | Present time 3:00PM | Today 4:00PM | | Today 5:00PM | ▷ |
| 1、DC a | a0 | a1 | a2 | a3 | |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | d11 e2 d12 | e3 | ... | e5 | e6 | e7 |

Fig. 6G

| Guide | Dc a | | |
|---|---|---|---|
| DC a | a2 29/3 4:19PM-29/35:19PM Brief Introduction of the content: XXXXXXXXXXXXXXX | | |
| Line | Present time 3:00PM | Today 4:00PM | Today 5:00PM ▷ |
| 1、DC a | a0 | a1 | a2 | a3 |
| 2、DC b | b0 | b1 | b2 | b3 | b4 | b5 |
| 3、DC c | c0 | c1 | c2 | c3 | c4 | c5 | c6 |
| 4、DC d | ←c11→←c12→ d0 | d1 | d2 | d3 | ... | d5 | ... | d8 |
| 5、DC e | ... | e2 | e3 | ... | e5 | e6 | e7 |

Fig. 6H

| Guide | Dc a | | |
|---|---|---|---|
| DC a | a2 29/3 4:19PM-29/35:19PM Brief Introduction of the content: XXXXXXXXXXXXXXX | | |
| Line | Present time 3:00PM | Today 4:00PM | Today 5:00PM ▷ |
| 1、DC a | a0 | ←b11→a1←b12→ | a2 | a3 |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 7A

| Guide | Dc a<br>a2<br>29/3 4:19PM-29/35:19PM<br>Brief Introduction of the content: XXXXXXXXXXXXXXX | | | | | | |
|---|---|---|---|---|---|---|---|
| DC a | | | | | | | |
| Line | Present time<br>3:00PM | | Today<br>4:00PM | | Today<br>5:00PM | | ▷ |
| 1、DC a | a0 | | a1 | | a2 | | a3 |
| 2、DC b | b0 | b1 c11 | | c12 b2 | b3 | b4 | b5 |
| 3、DC c | c0 | | c1 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 7B

| Guide | Dc a<br>a2<br>29/3 4:19PM-29/35:19PM<br>Brief Introduction of the content: XXXXXXXXXXXXXXX | | | | | | |
|---|---|---|---|---|---|---|---|
| DC a | | | | | | | |
| Line | Present time<br>3:00PM | | Today<br>4:00PM | | Today<br>5:00PM | | ▷ |
| 1、DC a | a0 | | a1 | | a2 | | a3 |
| 2、DC b | b0 | | b1 | | b2 | b3 | b4 | b5 |
| 3、DC c | c0 | d11 | c1<br>d12 | d13 | c2 | c3 | c4 | c5 | c6 |
| 4、DC d | d0 | d1 | d2 | d3 | ... | d5 | ... | d8 |
| 5、DC e | ... | e2 | e3 | ... | e5 | e6 | e7 |

Fig. 7C

| Guide | Dc a | | | | | | |
|---|---|---|---|---|---|---|---|
| DC a | a2<br>29/3 4:19PM-29/35:19PM<br>Brief Introduction of the content: XXXXXXXXXXXXXXX | | | | | | |
| Line | Present time<br>3:00PM | | Today<br>4:00PM | | Today<br>5:00PM | | ▷ |
| 1、DC a | a0 | | a1 | | a2 | a3 | |
| 2、DC b | b0 | b1 | b2 | b3 | | b4 | b5 |
| 3、DC c | c0 | c1 | c2 | c3 | | c4 | c5 | c6 |
| 4、DC d | d0 | d1 | d2 | d3 | | d5 | ... | d8 |
| | | ←e11→ | | ←e12→ | | | |
| 5、DC e | ... | e2 | e3 | ... | e5 | e6 | e7 |

Fig. 7D

| Guide | Dc a | | | | | | |
|---|---|---|---|---|---|---|---|
| DC a | a2<br>29/3 4:19PM-29/35:19PM<br>Brief Introduction of the content: XXXXXXXXXXXXXXX | | | | | | |
| Line | Present time<br>3:00PM | | Today<br>4:00PM | | Today<br>5:00PM | | ▷ |
| 1、DC a | a0 | | a1 | | a2 | a3 | |
| 2、DC b | b0 | b1 | b2 | b3 | | b4 | b5 |
| 3、DC c | c0 | c1 | c2 | c3 | | c4 | c5 | c6 |
| 4、DC d | d0 | d1 | d2 | d3 | | d5 | ... | d8 |
| 5、DC e | ... | e2 | e3 | ... | e5 | e6 | e7 |

Fig. 7E

| Guide | Dc a | | | | | |
|---|---|---|---|---|---|---|
| DC a | a2<br>29/3 4:19PM-29/35:19PM<br>Brief Introduction of the content: XXXXXXXXXXXXXXX | | | | | |
| Line | Present time<br>3:00PM | | Today<br>4:00PM | | Today<br>5:00PM | ▷ |
| 1、DC a | a0 | | a1 | a2 | a3 | |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... e2 | e3 | ... | e5 | e6 | e7 | |

Fig. 7F

| Guide | Dc a | | | | | |
|---|---|---|---|---|---|---|
| DC a | a2<br>29/3 4:19PM-29/35:19PM<br>Brief Introduction of the content: XXXXXXXXXXXXXXX | | | | | |
| Line | Present time<br>3:00PM | | Today<br>4:00PM | | Today<br>5:00PM | ▷ |
| 1、DC a | a0 | | a1 | a2 | a3 | |
| 2、DC b | b0 | b1 | b2 | b3 | b4 | b5 |
| 3、DC c | c0 | c1 | c2 | c3 | c4 | c5 | c6 |
| 4、DC d | d0 | d1 | d2 | d3 | ... | d5 | ... | d8 |
| 5、DC e | ... d11↔e2↔d12 | e3 | ... | e5 | e6 | e7 | |

Fig. 7G

| Guide | Dc a<br>a2<br>29/3 4:19PM-29/35:19PM<br>Brief Introduction of the content: XXXXXXXXXXXXXXX | | |
|---|---|---|---|
| DC a<br>Line | Present time<br>3:00PM | Today<br>4:00PM | Today<br>5:00PM ▷ |
| 1、DC a | a0 \| a1 | a2 | a3 |
| 2、DC b | b0 \| b1 | b2 | b3 \| b4 \| b5 |
| 3、DC c | c0 \| c1 | c2 \| c3 | c4 \| c5 \| c6 |
| 4、DC d | d0 \|c11\|c12\| d1 \| d2 \| d3 | ... \| d5 | ... \| d8 |
| 5、DC e | ... \| e2 \| e3 | ... \| e5 | e6 \| e7 |

Fig. 7H

CONTROL METHOD FOR FOCUS MOVEMENT ON EPG USER INTERFACE, AND DISPLAY DEVICE

CROSS-REFERENCE TO RELATED APPLICATIONS

This application is a continuation of U.S. patent application Ser. No. 16/990,673 filed Aug. 11, 2020, which is a continuation of International Application No. PCT/CN2019/091911 filed Jun. 19, 2020. The International Application claims the priority to Chinese Patent Application No. 201810639819.0 filed Jun. 20, 2018, Chinese Patent Application No. 201810639818.6 filed Jun. 20, 2018, Chinese Patent Application No. 201810638954.3 filed Jun. 20, 2018 and Chinese Patent Application No. 201810638978.9 filed Jun. 20, 2018. The entire disclosures of the above applications are incorporated herein by reference.

FIELD

The present disclosure relates to EPG and more particularly to a control method for focus movement on an EPG user interface and a display device.

BACKGROUND

This section provides background information related to the present disclosure which is not necessarily prior art.

Electronic Program Guide (EPG) displayed on a display screen of a smart television is arranged in a matrix form, and displays broadcast programs. EPG displays channels and time in two dimensions, and displays the various broadcast programs on the EPG in sizes that are in proportion to play durations of the broadcast programs.

Since the start and end time of different broadcast programs of different channels are random, the positions and sizes of respective broadcast programs on corresponding display regions in an EPG are also randomly presented in an entire EPG user interface. In particular, the randomness of the playing durations of different broadcast programs in each channel causes the display regions corresponding to the broadcast programs between different channels display in a staggering manner, resulting in irregular arrangements of the various broadcast programs including in the EPG Since each broadcast program in the EPG is dynamically generated according the playing duration and content information of each broadcast program, the position of focus movement cannot be statically specified. Therefore, when a focus is controlled to move between the various broadcast programs in the EPG there is a need to propose an algorithm to dynamically calculate the position of the focus movement.

A current algorithm is to calculate a next focus position according to the position of a current focus during each focus movement. In the process that the focus moves in a channel arrangement direction, due to the staggered displaying of the broadcast programs between different channels, there may be an offset after each movement. After multiple offsets, the focus will be away from an initial focus position. In some cases, the focus may eventually move to the boundary of a page. In this scenario, if a reverse operation is performed, the focus cannot be traced back, which affects user experience.

SUMMARY

This section provides a general summary of the disclosure, and is not a comprehensive disclosure of its full scope or all of its features.

The embodiments of the present disclosure provide a method for controlling focus move on an EPG user interface, and a display device, which allows for tracing back a focus when moving on the EPG user interface along a channel arrangement direction, to thereby enhance user experience.

In a first aspect, the embodiments of the present disclosure provide a method for controlling focus move on an EPG user interface in a display device. The method includes: displaying a television broadcast program on a display screen; receiving a first input instruction for displaying an EPG user interface; in response to the first input instruction, displaying the EPG user interface on a play image on the display screen, where the EPG user interface includes a two-dimensional program menu including television channels along a vertical direction and program play times in time order along a horizontal direction; while the focus holds on a first television broadcast program in a first television channel, receiving a first direction control instruction for indicating a focus move along a first direction of the vertical direction, wherein the first direction of the vertical direction is a direction from top to bottom or from bottom to top; in response to the first direction control instruction, determining a first reference time point within a playing period of the first television broadcast program, and controlling the focus to move to a second television broadcast program in a second television channel, where a playing period of the second television broadcast program includes the first reference time point; while the focus holds on the second television broadcast program, receiving a second direction control instruction for indicating a focus move along the first direction of the vertical direction; and in response to the second direction control instruction, controlling the focus to move to a third television broadcast program in a third television channel, where a playing period of the third television broadcast program includes the first reference time point.

In some implementations, the method further includes: while the focus holds on the third television broadcast program, receiving a third direction control instruction for indicating a focus move along a first direction of the horizontal direction, wherein the first direction of the horizontal direction is a direction from left to right or from right to left; in response to the third direction control instruction, controlling the focus to move to a fourth television broadcast program in the third television channel, where the fourth television broadcast program is different from the third television broadcast program; while the focus holds on the fourth television broadcast program, receiving a fourth direction control instruction for indicating a focus move along the first direction of the vertical direction; and in response to the fourth direction control instruction, determining a second reference time point within a playing period of the fourth television broadcast program, and controlling the focus to move to a fifth television broadcast program in a fourth television channel, where the playing period of the fifth television broadcast program includes the second reference time point.

In some implementations, the determining a first reference time point within a playing period of the first television broadcast program, and controlling the focus to move to a second television broadcast program in a second television channel includes: based on a preset rule, determining a first reference time point within the playing period of the first television broadcast program; traversing each television broadcast program in a second television channel, and searching a second television broadcast program in the second television channel, which has the playing period including the first reference time point; and calculating a new position of the focus move according to a channel index and a program index of the second television broadcast program, and controlling the focus to move to the second television broadcast program corresponding to the new position.

In some implementations, the controlling the focus to move to a fourth television broadcast program in the third television channel includes: calculating a new position of the focus move according to a program index of the fourth television broadcast program in the third television channel, and controlling the focus to move to the fourth television broadcast program corresponding to the new position.

In some implementations, the method further includes: determining any one of a start time, an end time or a time point between the start time and end time of a television broadcast program as a reference time point based on a preset rule, such as a time point at half point of the television broadcast program.

In a second aspect, the embodiments of the present disclosure provide a display device, including: a display screen; a memory, configured to store computer instructions and data associated with the display screen; and a processor, in communication with the memory and the display screen, where the processor is configured to execute the computer instructions to implement the method in the first aspect.

In a third aspect, the embodiments of the present disclosure provide a method for controlling focus move on an EPG user interface in a display device. The method includes: displaying a television broadcast program on a display screen; receiving a first input instruction for displaying an EPG user interface; in response to the first input instruction, displaying the EPG user interface on a play image on the display screen, where the EPG user interface includes a two-dimensional program menu including television channels along a vertical direction and play times in time order along horizontal direction; while the focus holds on a first television broadcast program in a first television channel, receiving a first direction control instruction for indicating a focus move along a first direction of the vertical direction; in response to the first direction control instruction, controlling the focus to move to a second television broadcast program in a second television channel, wherein a period of a playing period of the second television broadcast program overlapping with a playing period of the first television broadcast program is longer than those of other broadcast programs in the second television channel; while the focus holds on the second television broadcast program, receiving a second direction control instruction for indicating a focus move along the first direction of the vertical direction; and in response to the second direction control instruction, controlling the focus to move to a third television broadcast program in a third television channel, wherein a period of a playing period of the third television broadcast program overlapping with a playing period of the first television broadcast program is longer than those of other television broadcast programs in the third television channel.

In some implementations, the method further includes: while the focus holds on the third television broadcast program, receiving a third direction control instruction for indicating a focus move along a first direction of the horizontal direction; in response to the third direction control instruction, controlling the focus to move to a fourth television broadcast program in the third television channel, where the fourth television broadcast program is different from the third television broadcast program; while the focus holds on the fourth television broadcast program, receiving a fourth direction control instruction for indicating a focus move along the first direction of the vertical direction; and in response to the fourth direction control instruction, controlling the focus to move to a fifth television broadcast program in a fourth television channel, where a period of a playing period of the fifth television broadcast program overlapping with a playing period of the fourth television broadcast program is longer than those of other television broadcast programs in the fourth television channel.

In some implementations, the controlling the focus to move to a second television broadcast program in a second television channel, among multiple television broadcast programs in the second television channel includes: traversing each television broadcast program in the second television channel, and calculating a period of a playing period of each television broadcast program overlapping with a playing period of the first television broadcast program; if the period of the playing period of the second television broadcast program overlapping with the playing period of the first television broadcast program is the longest among the television broadcast programs in the second television channel, calculating a new position of a focus move according to a channel index of the second television channel and a program index of the second television broadcast program, and controlling the focus to move to the second television broadcast program corresponding to the new position.

In some implementations, the controlling the focus to move to a fourth television broadcast program in the third television channel includes: calculating a new position of the focus move according to a program index of the fourth television broadcast program in the third television channel, and controlling the focus to move to the fourth television broadcast program corresponding to the new position.

In a fourth aspect, the embodiments of the present disclosure provide a display device, including: a display screen; a memory, configured to store computer instructions and data related to the display screen; and a processor, in communication with the memory and the display screen, where the processor is configured to execute the computer instructions to implement the method in the third aspect.

In a fifth aspect, the embodiments of the present disclosure provide a method for controlling a focus move on an EPG user interface in a display device. The method includes: displaying a television broadcast program on a display screen; receiving a first input instruction for displaying an EPG user interface; in response to the first input instruction, displaying the EPG user interface on a play image on the display screen, where the user interface includes a two-dimensional program menu including television channels along a vertical direction and play times in time order along a horizontal direction; while the focus holds on a first television broadcast program in a first television channel, receiving a first direction control instruction for indicating a focus move along a first direction of the vertical direction; in response to the first direction control instruction, controlling the focus to move to a second television broadcast program in a second television channel, where a playing period of the first television broadcast program includes a first specific time point within a playing period of a second television broadcast program; while the focus holds on the second television broadcast program, receiving a second direction control instruction for indicating a focus move along the first direction of the vertical direction; and in response to the second direction control instruction, controlling the focus to move to a third television broadcast program in a third television channel, where the playing period of the first television broadcast program includes a second specific time point within a playing period of the third television broadcast program.

In some implementations, the method further includes: while the focus holds on the third television broadcast program, receiving a third direction control instruction for indicating a focus move along a first direction of the horizontal direction; in response to the third direction control instruction, controlling the focus to move to a fourth television broadcast program in the third television channel, where the fourth television broadcast program is different from the third television broadcast program; while the focus holds on the fourth television broadcast program, receiving a fourth direction control instruction for indicating a focus move along the first direction of the vertical direction; and in response to the fourth direction control instruction, controlling the focus to move to a fifth television broadcast program in a fourth television channel, where the playing period of the fourth television broadcast program includes a third specific time point within a playing period of the fifth television broadcast program.

In some implementations, the controlling the focus to move to a second television broadcast program in the second television channel, the playing period of the first television broadcast program including the first specific time point within the playing period of the second television broadcast program includes: based on a preset rule, determining first specific time points of each television broadcast program within a playing period of each television broadcast program in the second television channel; traversing each television broadcast program in the second television channel, and searching a second first television broadcast program that has a playing period including the first specific time point; and calculating a new position of a focus move according to a channel index of the second television channel and a program index of the second television broadcast program, and controlling the focus to move to the second television broadcast program corresponding to the new position.

In some implementations, the controlling the focus to move to a fourth television broadcast program in the third television channel includes: calculating a new position of a focus move according to a program index of the fourth television broadcast program in the third television channel, and controlling the focus to move to the fourth television broadcast program corresponding to the new position.

In some implementations, the method further includes: determining any one of a play start time, a play end time or a play time point corresponding to a half of a program playing period of a television broadcast program as a specific time point based on a preset rule.

In a sixth aspect, the embodiments of the present disclosure provide a display device, including: a display screen; a memory, configured to store computer instructions and data related to the display screen; and a processor, communicating with the memory and the display screen, where the processor is configured to execute the computer instructions to implement the method in the fifth aspect.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2B is a schematic diagram of downwards moving a focus for the first time on an EPG user interface.

FIG. 2C is a schematic diagram of downwards moving a focus for the second time on an EPG user interface.

FIG. 2D is a schematic diagram of downwards moving a focus for the third time on an EPG user interface.

FIG. 2E is a schematic diagram of downwards moving a focus for the fourth time on an EPG user interface.

FIG. 2F is a schematic diagram of upwards moving a focus for the first time on an EPG user interface.

FIG. 2G is a schematic diagram of upwards moving a focus for the second time on an EPG user interface.

FIG. 2H is a schematic diagram of upwards moving a focus for the third time on an EPG user interface.

FIG. 2I is a schematic diagram of upwards moving a focus for the fourth time on an EPG user interface.

FIG. 2J is a schematic diagram of a movement track of positions of a focus on an EPG user interface.

FIG. 4 is a schematic diagram of an EPG user interface.

FIG. 5A is a schematic diagram of downwards moving a focus for the first time on an EPG user interface by using Manner I.

FIG. 5B is a schematic diagram of downwards moving a focus for the second time on an EPG user interface by using Manner I.

FIG. 5C is a schematic diagram of downwards moving a focus for the third time on an EPG user interface by using Manner I.

FIG. 5D is a schematic diagram of downwards moving a focus for the fourth time on an EPG user interface by using Manner I.

FIG. 5E is a schematic diagram of a focus movement track on an EPG user interface by using Manner I.

FIG. 5F is a schematic diagram of rightwards moving a focus on an EPG user interface by using Manner I.

FIG. 5G is a schematic diagram of downwards moving a focus on an EPG user interface by using Manner I.

FIG. 5H is a schematic diagram of downwards moving a focus on an EPG user interface by using Manner I.

FIG. 6A is a schematic diagram of downwards moving a focus for the first time on an EPG user interface by using Manner II.

FIG. 6B is a schematic diagram of downwards moving a focus for the second time on an EPG user interface by using Manner II.

FIG. 6C is a schematic diagram of downwards moving a focus for the third time on an EPG user interface by using Manner II.

FIG. 6D is a schematic diagram of downwards moving a focus for the fourth time on an EPG user interface by using Manner II.

FIG. 6E is a schematic diagram of a focus movement track on an EPG user interface by using Manner II.

FIG. 6F is a schematic diagram of leftwards moving a focus on an EPG user interface by using Manner II.

FIG. 6G is a schematic diagram of downwards moving a focus on an EPG user interface by using Manner II.

FIG. 6H is a schematic diagram of downwards moving a focus on an EPG user interface by using Manner II.

FIG. 7A is a schematic diagram of downwards moving a focus for the first time on an EPG user interface by using Manner III.

FIG. 7B is a schematic diagram of downwards moving a focus for the second time on an EPG user interface by using Manner III.

FIG. 7C is a schematic diagram of downwards moving a focus for the third time on an EPG user interface by using Manner III.

FIG. 7D is a schematic diagram of downwards moving a focus for the fourth time on an EPG user interface by using Manner III.

FIG. 7E is a schematic diagram of a focus movement track on an EPG user interface by using Manner III.

FIG. 7F is a schematic diagram of leftwards moving a focus on an EPG user interface by using Manner III.

FIG. 7G is a schematic diagram of upwards moving a focus on an EPG user interface by using Manner III.

FIG. 7H is a schematic diagram of upwards moving a focus on an EPG user interface by using Manner III.

Corresponding reference numerals indicate corresponding parts or features throughout the several views of the drawings.

DETAILED DESCRIPTION

Technical schemes in embodiments of the present disclosure will be described clearly and completely below in combination with the drawings in the embodiments of the present disclosure. It is apparent that the embodiments described herein are only a part of the embodiments of the present disclosure, not all the embodiments. Based on the embodiments in the present disclosure, all other embodiments obtained by those of ordinary skill in the art without creative work shall fall within the protection scope of the present disclosure.

A smart television is taken as an example of a display device. The present embodiment is described in detail.

Figures 1, 2A:
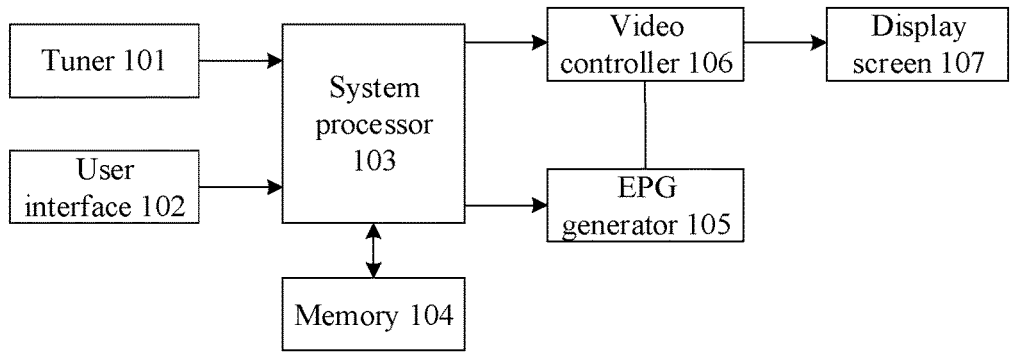
FIG. 1 is a schematic diagram of a smart television.
FIG. 2A is a schematic diagram of an initial position of a focus on an EPG user interface.

FIG. 1 is a schematic diagram of a smart television. As shown in FIG. 1, the smart television may include a tuner 101, a user interface 102, a system processor 103, a memory 104, an EPG generator 105, a video controller 106, a display screen 107, and the like. The tuner 101 is used to tune broadcast channels under the control of the system processor 103 according to an operation of a user on the user interface 102. The memory 104 is used to store EPG information extracted from additional information included in a digital broadcast signal or an analog broadcast signal received from the tuner 101. The EPG generator 105 may include an On Screen Display (OSD) generator and is used to generate an EPG based on the EPG information stored in the memory 104. The display screen 107 is used to display the EPG processed by the video controller 106.

Specifically, in the process of displaying a television broadcast program on the display screen 107 of the smart television, an EPG display request signal sent from the user through the user interface 102 (a remote controller) is input to the system processor 103, that is, in response to the EPG display request issued from the user, the system processor 103 extracts the EPG information from the broadcast signal received by the tuner 101, so that the EPG generator 105 may construct the EPG based on the extracted EPG information and the EPG image generated by the OSD generator using image (OSD) data, and then the EPG user interface is displayed on the display screen 107 via the video controller 106.

The above extracted EPG information is used to indicate a play schedule of a plurality of broadcast programs, and may include name, type, start time, play end time, and the like of each broadcast program.

FIG. 2A is a schematic diagram of an EPG user interface. As shown in FIG. 2A, a vertical direction is a channel axis direction to display different channels in a multi-line form; and a horizontal direction is a time axis direction. Various broadcast programs in each line are arranged in a play time order, and the sizes of display regions of the various broadcast programs indicate their play durations. Five channels (i.e. DC a-DC e) are shown in the EPG user interface in FIG. 2A, and the broadcast programs of each channel are arranged and displayed into one line according to the program play time order. For example, FIG. 2A shows a broadcast program menu between 3:00 PM to 5:00 PM, including broadcast programs a0-a3 of channel DC a, broadcast programs b0-b5 of channel DC b, broadcast programs c0-c6 of channel DC c, broadcast programs d0-d8 of channel DC d, and broadcast programs e0-e7 of channel DC e.

When a focus is controlled to hold on a broadcast program at a certain position, the EPG user interface shows a guide of the broadcast program at the same time. The guide may include a channel index, the play time, a profile and the like of the broadcast program. As shown in FIG. 2A, when the focus is controlled to hold on the broadcast program a2, a channel index DC a of a channel to which the broadcast program a2 belongs, the play time 29/3 4:19 PM-29/3 5:19 PM of the broadcast program a2, and the profile of the broadcast program a2 are displayed in a guide region located on the upper side of the EPG user interface.

Since the start time and end time for a broadcast program on each channel are different, the sizes of the display regions which indicate the durations of the broadcast programs on each channel in the EPG are different, that is, a start position (corresponding to the start time) and an end position (corresponding to the end time) of each program in the above display regions are random. Therefore, the display regions of the broadcast programs in a plurality of upper and lower lines in the EPG are displayed in a staggering manner. For example, the end positions of the display regions that indicate durations of the broadcast programs a0, b0 and c0 are not aligned, so that the start positions of the display regions that indicate the durations of the broadcast programs a1, b1 and c1 are not aligned. Therefore, in the process of controlling the focus to move up and down in the EPG due to the staggered displaying of the various broadcast programs between different lines, there may be an offset in a left-right direction after each movement. After multiple offsets, the focus will be away from an initial focus position. In some cases, the focus will eventually move to the boundary of a page.

FIG. 2A is taken as an example. When the focus falls onto the broadcast program a3 at the beginning, upon receiving an instruction, such as a user presses a down key on a remote controller once, taking the play start time on the left side of the broadcast program a3 as a benchmark, the focus is controlled to move to broadcast program b3, and the start time of the broadcast program a3 falls within a period defining by the start time and end time of the broadcast program b3, as shown in FIG. 2B. Upon receiving an instruction, such as a user presses the down key on the remote controller once, taking start time on the left side of the broadcast program b3 as a benchmark, the focus is controlled to move to the broadcast program c3, the start time of the broadcast program b3 falls within a period defining by start time and end time of the broadcast program c3, as shown in FIG. 2C. Upon receiving an instruction, such as the user presses the down key on the remote controller once, taking the start time on the left side of the broadcast program c3 as a benchmark, the focus is controlled to move to the broadcast program d3, and the start time of the broadcast program c3 falls within a period defining by the start time and end time of the broadcast program d3, as shown in FIG. 2D. When receiving an instruction, such as the user presses the down key on the remote controller once, taking the start time on the left side of the broadcast program d3 as a benchmark, the focus is controlled to move to the broadcast program e3, and the start time of the broadcast program d3 falls within a period defining by the start time and end time of the broadcast program e3, as shown in FIG. 2E. In this way, a path of downward movement of the focus from the broadcast program a3 is a3-b3-c3-d3-e3, as shown in FIG. 2E, so that an offset between the broadcast program e3 where the focus holds eventually and the broadcast program a3 where the focus holds initially is relatively large.

Meanwhile, when the focus holds on the broadcast program e3, upon receiving an instruction, such as the user presses an upward key on the remote controller once, taking the start time on the left side of the broadcast program e3 as a benchmark, the focus is controlled to move to the broadcast program d1, and the start time of the broadcast program e3 falls within a period defining by the start time and end time of the broadcast program d1, as shown in FIG. 2F. Similarly, the focus is controlled to move upward to the broadcast programs c1 (as shown in FIG. 2G), b0 (as shown in FIG. 2H), and a0 (as shown in FIG. 2I). In this way, a path of upward movement of the focus from the broadcast program e3 is e3-d1-c1-b0-a0, as shown in FIG. 2J, so that an offset between the broadcast program a0 where the focus holds eventually and the broadcast program e3 where the focus holds initially is relatively large.

Further, it can be seen from the up-and-down movement path of the focus, the broadcast program a0 where the focus eventually holds and the broadcast program e3 where the focus holds initially have a relatively large offset in the left-right direction, so that the position of the eventual focus may not go back to a3. Therefore, it can be seen that in a reverse operation, a phenomenon of a back track failure of the focus may appear, which affects user experience.

In other words, when the focus is controlled to move up and down in the broadcast programs between different channels, since the various broadcast programs between the different channels are displayed in the staggering manner, and the new position of the movement of the focus needs to be calculated in real time according to a position where the focus holds on the broadcast program of the previous channel before the movement, the focus is controlled to move to the broadcast program displayed at the new position. In this way, the broadcast program where the focus falls eventually and the broadcast program where the focus falls initially has a relatively offset in the left-right direction, which brings trouble to the user.

In order to solve the above problems, a scheme has been proposed: when the focus is controlled to move up and down on the broadcast programs between the different channels, the new position of the movement of the focus is calculated according to the position of a selected reference broadcast program, thus controlling the focus to move to the broadcast program displayed at the new position. In this way, in the process of controlling the focus to move up or down on the broadcast programs between the different channels, the same reference broadcast program is referred, which may avoid the broadcast program selected by the movement of the focus from generating a relatively offset in the left-right direction and may solve the problem that the focus in the EPG user interface may not be backtracked during the up-and-down movement, thus enhancing user experience.

Figure 3:
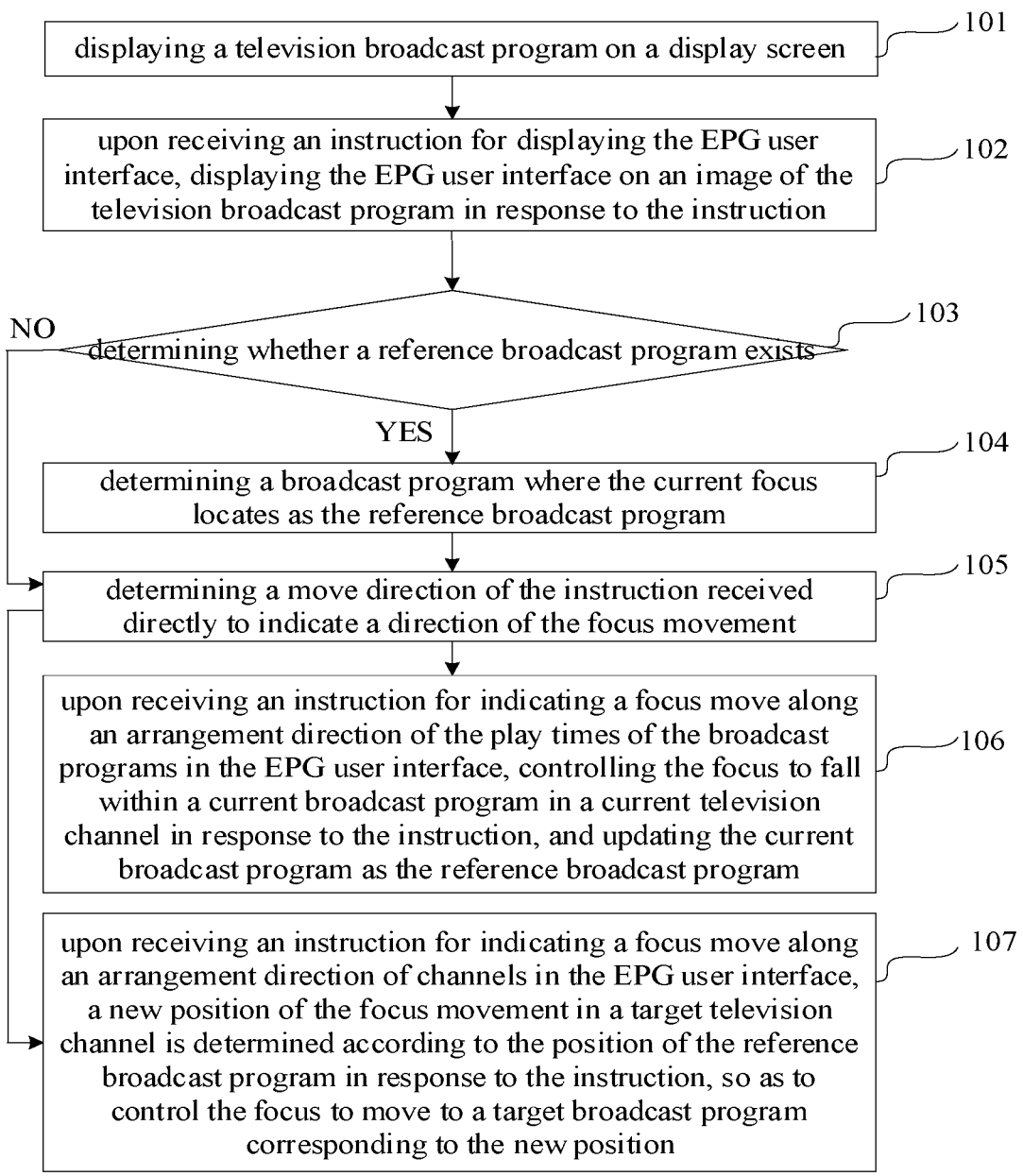
FIG. 3 is a flow chart of a control method for focus movement on an EPG user interface.

As shown in FIG. 3, the embodiment of the present application provides a control method for focus movement on an EPG user interface, including the following operations.

Step 101, displaying a television broadcast program on a display screen.

Step 102, upon receiving an instruction for displaying the EPG user interface, displaying the EPG user interface on an image of the television broadcast program in response to the instruction.

Step 103, determining whether a reference broadcast program exists.

Step 104, in response to that the reference broadcast program exists, after a broadcast program where a current focus locates is determined as the reference broadcast program, a move direction of the instruction received is determined to indicate a direction of the focus movement.

Step 105, in response to that the reference broadcast program does not exist, a move direction of the instruction received is directly determined to indicate a direction of the focus movement.

Step 106, upon receiving an instruction for indicating a focus move along an arrangement direction of the play times of the broadcast programs in the EPG user interface, controlling the focus to fall within a current broadcast program in a current television channel in response to the instruction, and updating the current broadcast program as the reference broadcast program.

Step 107, upon receiving an instruction for indicating a focus move along an arrangement direction of channels in the EPG user interface, a new position of the focus movement in a target television channel is determined according to the position of the reference broadcast program in response to the instruction, so as to control the focus to move to a target broadcast program corresponding to the new position.

In the embodiments of the present disclosure, when the focus is controlled to move along a channel axis direction of the EPG user interface, the new position of the focus movement may be determined according to the position of the reference broadcast program. In this manner, when moving along the channel axis direction at each time, the focus moves with reference to the position of the same reference broadcast program, so that it may be avoided that a relatively large offset is generated when the focus moves along a time axis direction of the EPG user interface, and the focus movement has a higher convergence. Since the position of the reference broadcast program is kept unchanged, the movement paths of the focus along the channel axis direction and its reverse direction are opposite, thereby solving the problem that the focus in the EPG user interface may not be backtracked when moving along the channel axis direction, and enhancing user experience.

In the embodiments of the present disclosure, the position of the focus may be expressed by a channel index and a program index of a broadcast program where the focus locates. For example, a global variable channel index is used to store a channel number to which the broadcast program with the current focus belongs, and a global variable program index is used to store an index value of the broadcast program with the current focus. A global variable lastFocusProgram is used to store the position of the reference broadcast program. The position may include the channel number to which the reference broadcast program belongs, and the index value of the reference broadcast program.

It should be noted that in the EPG user interface, the broadcast program where the focus locates is highlighted. For example, a display region that represents the broadcast program is amplified at the original position, and/or the edge of the display region is thickened, and/or the display region is of a shadow style, so as to distinguish other broadcast programs.

Specifically, as shown in FIG. 2A, in the EPG user interface displayed on the display screen, upon receiving an instruction for indicating a focus move along the left-right direction of the same line, the target broadcast program to which the focus moves is determined according to a target index value, and a new focus position is set according to the position of the target broadcast program, so as to locate the position, to which the focus moves, in the target broadcast program by changing the index value of the broadcast program when the line number is not changed; and the position of the focus in the broadcast program after movement is stored as the position of the reference broadcast program.

Upon receiving an instruction for indicating a focus move along an up-down direction of different lines, all the broadcast programs in the previous/next line are traversed, and according to the position of the reference broadcast program, the line number and the index value of the target broadcast program, to which the focus moves, in the previous/next line are determined, thereby setting the new focus position.

The aforementioned line number (channel index) may be automatically subtracted by 1 or added by 1 according to whether a focus move direction is up or down, and the index value (program index) may be automatically subtracted by 1 or added by 1 according to whether the focus move direction is left or right, so that the new focus position may be set according to the line number and the index value of the broadcast program.

Exemplarily, in the EPG user interface displayed on the display screen shown in FIG. 2A, before an instruction that the user presses a direction key of a remote controller is received, it is firstly determined whether the reference broadcast program exists.

If a position of the reference broadcast program is not found in the global variable lastFocusProgram, it is determined that the reference broadcast program is absent, so that an initial broadcast program where the current focus locates is determined as the reference broadcast program. For example, in FIG. 2I, the current focus position is identified as the line number Dc a and the index value a0, that is, the focus is located in the broadcast program a0, so that the line number to which the broadcast program with the current focus belongs is stored as Dc a in the global variable channel index, and the index value of the broadcast program with the current focus is stored as a0 in the global variable program index. Meanwhile, the broadcast program a0 is determined as the reference broadcast program, and the line number Dc a to which the reference broadcast program a0 belongs and the index value a0 of the reference broadcast program are stored in the global variable lastFocusProgram as the position of the reference broadcast program.

If the position of the reference broadcast program a0 with the line number Dc a and the index value a0 is found in the global variable lastFocusProgram, it is determined that the reference broadcast program a0 exists. Then, a remote controller direction key instruction sent from the user will be received and make a response to the instruction.

In some examples, when the focus holds on the broadcast program a0, and an instruction that the user presses a right key on the remote controller once is received, as shown in FIG. 4, the new position of the focus movement is identified that the line number (channel index) is still Dc a, and the index value is automatically added by 1 and changed to a1, that is, the focus moves to the broadcast program a1 corresponding to the new position, and the index value, which is stored in the global variable program index, of the broadcast program where the current focus locates is updated with a1. Meanwhile, the broadcast program a1 is updated with the reference broadcast program, and the line number Dc a to which the reference broadcast program a1 belongs and the index value a1 are stored in the global variable lastFocusProgram as the position of the reference broadcast program.

When the focus moves between different channels according to a user operation, the embodiments of the present disclosure determine the target broadcast program according to the following manners.

Manner I.

The various broadcast programs in a target television channel are traversed. It is determined whether a period (i.e., the program play time) between a start time and an end time of a certain broadcast program in the target television channel includes a first reference time point of a reference broadcast program. In other words, it is determined whether the first reference time of the reference broadcast program is within the period (i.e., the play time) between the start time and end time of the certain broadcast program in the target television channel.

If the play time of the target broadcast program includes the first reference time of the reference broadcast program, a new position of the focus movement is calculated, and the focus is controlled to move to the target broadcast program corresponding to the new position.

The first reference time of the reference broadcast program may be any one of a start time, an end time or a play time point corresponding to a half of the play time of the program based on a preset rule. The reference to the preset rule is to ensure that the focus moves within a convergence range that meets the expectations of the user to avoid a relatively large offset caused by the focus movement, to thereby enhance the user experience.

As shown in FIG. 4, when the focus holds on a broadcast program a1, and the user presses the down key on the remote controller once, the broadcast programs b0-b5 in the channel with the line number Dc b are traversed in a chronological order, and it is determined that the play time of the broadcast program b1 includes the first reference time point of the reference broadcast program a1 (e.g. the first reference time point is selected as the start time) according to the line number Dc a to which the reference broadcast program belongs and the index value a1 of the reference broadcast program stored in the global variable lastFocusProgram, so that the index value b1 of the broadcast program b1 is returned.

As shown in FIG. 5A, the new position of the focus movement is identified that the line number is automatically added by 1 and changed to Dc b, and the index value is b1, thus controlling the focus to move to the broadcast program b1 corresponding to the new position. Meanwhile, the line number to which the broadcast program with the current focus belongs and stored in the global variable channel index is updated with Dc b, and the index value, which is stored in the global variable program index, of the broadcast program with the current focus is updated with b1.

When the focus holds on the broadcast program b1, and the user continues to press the down key on the remote controller once, the broadcast programs c0-c6 in the channel with the line number Dc c are traversed in the chronological order, and it is determined that the program play time of the broadcast program c1 includes the start time of the reference broadcast program a1 according to the line number Dc a to which the reference broadcast program belongs and the index value a1 of the reference broadcast program stored in the global variable lastFocusProgram, so that the index value c1 of the broadcast program c1 is returned. As shown in FIG. 5B, the new position of the focus movement is identified that the line number is automatically added by 1 and changed to Dc c, and the index value is c1, thus controlling the focus to move to the broadcast program c1 corresponding to the new position. Meanwhile, the line number to which the broadcast program with the current focus belongs and stored in the global variable channel index is updated with Dc c, and the index value, which is stored in the global variable program index, of the broadcast program with the current focus is updated with c1.

In some embodiments, when the focus falls on the broadcast program c1, and the user continues to press the down key on the remote controller once, the broadcast programs d0-d8 in the channel with the line number Dc d are traversed in the chronological order, and it is determined that the program play time of the broadcast program d1 includes the play start time of the reference broadcast program a1 according to the line number Dc a to which the reference broadcast program belongs and the index value a1 of the reference broadcast program stored in the global variable lastFocusProgram, so that the index value d1 of the broadcast program d1 is returned. As shown in FIG. 5C, the new position of the focus movement is identified that the line number is automatically added by 1 and changed to Dc d, and the index value is d1, thus controlling the focus to move to the broadcast program d1 corresponding to the new position. Meanwhile, the line number to which the broadcast program with the current focus belongs and stored in the global variable channel index is updated with Dc d, and the index value, which is stored in the global variable program index, of the broadcast program with the current focus is updated with d1.

When the focus holds on the broadcast program d1, and the user continues to press the down key on the remote controller once, the broadcast programs e0-e7 in the channel with the line number Dc e are traversed in the chronological order, and it is determined that the play time of the broadcast program e3 includes the play start time of the reference broadcast program a1 according to the line number Dc a to which the reference broadcast program belongs and the index value a1 of the reference broadcast program stored in the global variable lastFocusProgram, so that the index value e3 of the broadcast program e3 is returned. As shown in FIG. 5D, the new position of the focus movement is identified that the line number is automatically added by 1 and changed to Dc e, and the index value is e3, thus controlling the focus to move to the broadcast program e3 corresponding to the new position. Meanwhile, the line number to which the broadcast program with the current focus belongs and stored in the global variable channel index is updated with Dc e, and the index value, which is stored in the global variable program index, of the broadcast program with the current focus is updated with e3.

Meanwhile, when the focus holds on the broadcast program e3, and the user presses the up key on the remote controller once, the broadcast programs d0-d8 in the channel with the line number Dc d are traversed in the chronological order, and it is determined that the play time of the broadcast program d1 includes the play start time of the reference broadcast program a1 according to the line number Dc a to which the reference broadcast program belongs and the index value a1 of the reference broadcast program stored in the global variable lastFocusProgram, so that the index value d1 of the broadcast program d1 is returned. As shown in FIG. 5C, the new position of the focus movement is identified that the line number is automatically subtracted by 1 and changed from Dc e into Dc d, and the index value is d1, thus controlling the focus to move to the broadcast program d1 corresponding to the new position. Meanwhile, the line number to which the broadcast program with the current focus belongs and stored in the global variable channel index is updated with Dc d, and the index value, which is stored in the global variable program index, of the broadcast program with the current focus is updated with d1.

When the focus holds on the broadcast program d1, and the user continues to press the up key on the remote controller, the broadcast programs c0-c6 in the channel with the line number Dc c are traversed in the chronological order, and it is determined that the program play time of the broadcast program c1 includes the play start time of the reference broadcast program a1 according to the line number Dc a to which the reference broadcast program belongs and the index value a1 of the reference broadcast program stored in the global variable lastFocusProgram, so that the index value c1 of the broadcast program c1 is returned. As shown in FIG. 5B, the new position of the focus movement is identified that the line number is automatically subtracted by 1 and changed from Dc d into Dc c, and the index value is c1, thus controlling the focus to move to the broadcast program c1 corresponding to the new position.

When the focus holds on the broadcast program c1, and the user continues to press the up key on the remote controller, the focus is controlled to move to the broadcast programs b1 (as shown in FIG. 5A) and a1 (as shown in FIG. 4) similarly.

As shown in FIG. 5E, a path of downward movement of the focus is: a1-b1-c1-d1-e3, and a path of upward movement of the focus is: e3-d1-c1-b1-a1. It can be seen from this that on one hand, in the upward movement path of the focus and the downward movement path of the focus, the broadcast program where the focus falls and the reference broadcast program basically have no offset in the left-right direction, thereby ensuring that the focus moves within a convergence range that meets the expectations of the user; on the other hand, the upward movement path and the downward movement path of the focus are opposite, thus ensuring that the movement path of the focus is traceable and enhancing the user experience.

In some other examples, when the focus holds on the broadcast program c1, and the user presses a right key on the remote controller once, as shown in FIG. 5F, the new position of the focus movement is identified that the line number (channel index) is Dc c, and the index value is automatically added by 1 and changed to c2, that is, the focus moves to the broadcast program c2 corresponding to the new position, and the index value, which is stored in the global variable program index, of the broadcast program with the current focus is updated with c2. At the same time, the broadcast program c2 is updated with the reference broadcast program, and the line number Dc c to which the reference broadcast program c2 belongs and the index value c2 of the reference broadcast program c2 are stored in the global variable lastFocusProgram as the position of the reference broadcast program.

When the focus holds on the broadcast program c2, and the user presses the down key on the remote controller once, the broadcast programs d0-d8 in the channel with the line number Dc d are traversed in the chronological order, and it is determined that the program playing period of the broadcast program d3 includes the play start time of the reference broadcast program c2 according to the line number Dc c to which the reference broadcast program belongs and the index value c2 of the reference broadcast program stored in the global variable lastFocusProgram, so that the index value d3 of the broadcast program d3 is returned. As shown in FIG. 5G; the new position of the focus movement is identified that the line number is automatically added by 1 and changed from Dc c into Dc d, and the index value is d3, thus controlling the focus to move to the broadcast program d3 corresponding to the new position. Meanwhile, the line number to which the broadcast program with the current focus belongs and stored in the global variable channel index is updated with Dc d, and the index value, which is stored in the global variable program index, of the broadcast program with the current focus is updated with d3.

When the focus holds on the broadcast program d3, and the user presses the down key on the remote controller once, the broadcast programs e0-e7 in the channel with the line number Dc e are traversed in the chronological order, and it is determined that the program play time of the broadcast program e4 includes the play start time of the reference broadcast program c2 according to the line number Dc c to which the reference broadcast program belongs and the index value c2 of the reference broadcast program stored in the global variable lastFocusProgram, so that the index value e4 of the broadcast program e4 is returned. As shown in FIG. 5H, the new position of the focus movement is identified that the line number is automatically added by 1 and changed from Dc d into Dc e, and the index value is e4, thus controlling the focus to move to the broadcast program e4 corresponding to the new position. Meanwhile, the line number to which the broadcast program with the current focus belongs and stored in the global variable channel index is updated with Dc e, and the index value, which is stored in the global variable program index, of the broadcast program with the current focus is updated with e4.

The above processes are repeatedly performed, so as to realize the movement of the focus in the EPG user interface.

In the above examples, when the focus moves up and down, whether the play time of a certain broadcast program in the target television channel includes the first reference time point of the reference broadcast program may be determined according to the position of the reference broadcast program, so as to determine the new position of the focus movement. In this way, when moving up and down at each time, the focus moves with reference to the position of the same reference broadcast program, which may prevent the focus from generating a relatively large offset in the left-right direction during the movement. Since the position of the reference broadcast program is kept unchanged, the upward movement path and the downward movement path of the focus are opposite, thereby solving the problem that the focus in the EPG user interface may not be backtracked when moving up and down, and enhancing user experience.

Manner II.

The various broadcast programs in a target television channel are traversed; it is determined whether a period (i.e., the program play time) between the play start time and end time of the reference broadcast program includes a specific time point of a certain broadcast program in the target television channel. In other words, it is determined whether the specific time point of a certain broadcast program in the target television channel is included within the period (i.e., the program play time) defining by the start time and end time of the reference broadcast program.

If the duration time period of the reference broadcast program includes the specific time point of the target broadcast program, a new position of the focus movement is calculated, and the focus is controlled to move to the target broadcast program corresponding to the new position.

The specific time point of the broadcast program may be any one of the start time, the end time or a time point corresponding to a half of the play time of the program according to a preset rule. The reference to the preset rule is to ensure that the focus moves in an expected convergence range of the user to avoid a relatively large offset caused by the focus movement and enhance user experience.

In some examples, as shown in FIG. 4, when the focus holds on the broadcast program a1, and the user presses the down key on the remote controller once, the broadcast programs b0-b5 in the channel with the line number Dc b are traversed in a chronological order, and it is determined that the program playing period of the reference broadcast program a1 includes the specific time point of the broadcast program b1 (if the specific time point is selected as the play end time) according to the line number Dc a to which the reference broadcast program belongs and the index value a1 of the reference broadcast program stored in the global variable lastFocusProgram, so that the index value b1 of the broadcast program b1 is returned.

As shown in FIG. 6A, the new position of the focus movement is identified that the line number is automatically added by 1 and changed to Dc b, and the index value is b1, thus controlling the focus to move to the broadcast program b1 corresponding to the new position. Meanwhile, the line number to which the broadcast program with the current focus and stored in the global variable channel index is updated with Dc b, and the index value, which is stored in the global variable program index, of the broadcast program with the current focus is updated with b1.

In some embodiments, when the focus holds on the broadcast program b1, and the user continues to press the down key on the remote controller once, the broadcast programs c0-c6 in the channel with the line number Dc c are traversed in the chronological order, and it is determined that the program play period of the reference broadcast program a1 includes the play end time of the broadcast program c1 according to the line number Dc a to which the reference broadcast program belongs and the index value a1 of the reference broadcast program stored in the global variable lastFocusProgram, so that the index value c1 of the broadcast program c1 is returned. As shown in FIG. 6B, the new position of the focus movement is identified that the line number is automatically added by 1 and changed to Dc c, and the index value is c1, thus controlling the focus to move to the broadcast program c1 corresponding to the new position. Meanwhile, the line number to which the broadcast program with the current focus belongs and stored in the global variable channel index is updated with Dc c, and the index value, which is stored in the global variable program index, of the broadcast program with the current focus is updated with c1.

When the focus holds on the broadcast program c1, and the user continuous to press the down key on the remote controller once, the broadcast programs d0-d8 in the channel with the line number Dc d are traversed in the chronological order, and it is determined that the program play period of the reference broadcast program a1 includes the play end times of the broadcast programs d1 and d2 according to the line number Dc a to which the reference broadcast program belongs and the index value a1 of the reference broadcast program stored in the global variable lastFocusProgram, since the broadcast program d1 is traversed first, the index value d1 of the broadcast program d1 is returned. As shown in FIG. 6C, the new position of the focus movement is identified that the line number is automatically added by 1 and changed to Dc d, and the index value is d1, thus controlling the focus to move to the broadcast program d1 corresponding to the new position.

Then, when the focus holds on the broadcast program d1, and the user continues to press the down key on the remote controller, the broadcast programs e0-e7 in the channel with the line number Dc e are traversed in the chronological order, and it is determined that the program play period of the reference broadcast program a1 includes the play end time of the broadcast program e3 according to the line number Dc a to which the reference broadcast program belongs and the index value a1 of the reference broadcast program stored in the global variable lastFocusProgram, so that the index value e3 of the broadcast program e3 is returned. As shown in FIG. 6D, the new position of the focus movement is identified that the line number is automatically added by 1 and changed to Dc e, and the index value is e3, thus controlling the focus to move to the broadcast program e3 corresponding to the new position.

At the time point, when the focus holds on the broadcast program e3, and the user presses the up key on the remote controller once, the broadcast programs d0-d8 in the channel with the line number Dc d are traversed in the chronological order, and it is determined that the program play period of the reference broadcast program a1 includes the play end times of the broadcast programs d1 and d2 according to the line number Dc a to which the reference broadcast program belongs and the index value a1 of the reference broadcast program stored in the global variable lastFocusProgram, since the broadcast program d1 is traversed first, the index value d1 of the broadcast program d1 is returned. As shown in FIG. 6C, the new position of the focus movement is identified that the line number is automatically subtracted by 1 and changed from Dc e to Dc d, and the index value is d1, thus controlling the focus to move to the broadcast program d1 corresponding to the new position.

Similarly, when the user presses the up key on the remote controller in succession, the focus is controlled to move to the broadcast programs c1 (as shown in FIG. 6B), b1 (as shown in FIG. 6A), and a1 (as shown in FIG. 4) in sequence.

As shown in FIG. 6E, a path of downward movement of the focus is: a1-b1-c1-d1-e3, and a path of upward movement of the focus is: e3-d1-c1-b1-a1. It can be seen from this that on one hand, in the upward movement path of the focus and the downward movement path of the focus, the broadcast program where the focus falls and the reference broadcast program basically have no offset in the left-right direction, thereby ensuring that the focus moves within a convergence range that meets the expectations of the user; on the other hand, the upward movement path and the downward movement path of the focus are opposite, thus ensuring that the movement path of the focus is traceable and enhancing the user experience.

In some other embodiments, when the focus holds on the broadcast program b1, and the user presses a left key on the remote controller once, as shown in FIG. 6F, the new position of the focus movement is identified that the line number (channel index) is Dc b, and the index value is automatically subtracted by 1 and changed to b0, that is, the focus moves to the broadcast program b0 corresponding to the new position, and the index value, which is stored in the global variable program index, of the broadcast program with the current focus is updated with b0. At the same time, the broadcast program b0 is updated with the reference broadcast program, and the line number Dc b to which the reference broadcast program b0 belongs and the index value b0 of the reference broadcast program are stored in the global variable lastFocusProgram as the position of the reference broadcast program.

When the focus holds on the broadcast program b0, and the user presses the down key on the remote controller once, the broadcast programs c0-c6 in the channel with the line number Dc c are traversed in chronological order, and it is determined that the program playing period of the reference broadcast program b0 includes the play end time of the broadcast program c0 according to the line number Dc b to which the reference broadcast program belongs and the index value b0 of the reference broadcast program stored in the global variable lastFocusProgram, so that the index value c0 of the broadcast program c0 is returned. As shown in FIG. 6G, the new position of the focus movement is identified that the line number is automatically added by 1 and changed from Dc b to Dc c, and the index value is c0, thus controlling the focus to move to the broadcast program c0 corresponding to the new position. Meanwhile, the line number to which the broadcast program with the current focus belongs and stored in the global variable channel index is updated with Dc c, and the index value, which is stored in the global variable program index, of the broadcast program with the current focus is updated with c0.

When the focus holds on the broadcast program c0, and the user presses the down key on the remote controller once, the broadcast programs d0-d8 in the channel with the line number Dc d are traversed in chronological order, and it is determined that the program playing period of the reference broadcast program b0 includes the play end time of the broadcast program d0 according to the line number Dc b to which the reference broadcast program belongs and the index value b0 of the reference broadcast program stored in the global variable lastFocusProgram, so that the index value d0 of the broadcast program d0 is returned. As shown in FIG. 6H, the new position of the focus movement is identified that the line number is automatically added by 1 and changed from Dc c into Dc d, and the index value is d0, thus controlling the focus to move to the broadcast program d0 corresponding to the new position. Meanwhile, the line number to which the broadcast program with the current focus belongs and stored in the global variable channel index is updated with Dc d, and the index value, which is stored in the global variable program index, of the broadcast program with the current focus is updated with d0.

The above processes are repeatedly performed, so as to realize the movement of the focus in the EPG user interface.

In the above examples, when the focus moves up and down, whether the program playing period of the reference broadcast program includes the specific time point of a certain broadcast program in the target television channel may be determined according to the position of the reference broadcast program, so as to determine the new position of the focus movement. In this way, when moving up and down at each time, the focus moves with reference to the position of the same reference broadcast program, which may prevent the focus from generating a relatively large offset in the left-right direction during the movement. Since the position of the reference broadcast program is kept unchanged, the upward movement path and the downward movement path of the focus are opposite, thereby solving the problem that the focus in the EPG user interface may not be backtracked when moving up and down, and enhancing user experience.

Manner III.

A new focus position is located by comparing the length of the overlap time period of the play time period of the reference broadcast program and the play time period of the target broadcast program.

That is, the operation 107 that the new position of the focus movement in the target television channel is determined according to the position of the reference broadcast program, so as to control the focus to move to the target broadcast program corresponding to the new position may specifically include: the various broadcast programs in the target television channel are traversed, and the overlap time periods of the play time periods of the various broadcast programs and the play time period of the reference broadcast program are calculated. If the overlap time period of the play time period of the target broadcast program and the play time period of the reference broadcast program is the longest among the overlap time periods of the play time periods of the various broadcast programs and the play time period of the reference broadcast program, the new position of the focus movement is calculated, and the focus is controlled to move to the target broadcast program corresponding to the new position.

As shown in FIG. 4, when the focus holds on the broadcast program a1, and the user presses the down key on the remote controller once, the broadcast programs b0-b5 in the channel with the line number Dc b are traversed in the chronological order, and the lengths of the overlap time periods of the play time periods of the broadcast programs b0-b5 and the play time period of the reference broadcast program a1 are calculated according to the line number Dc a to which the reference broadcast program belongs and the index value a1 of the reference broadcast program stored in the global variable lastFocusProgram. For example, the broadcast programs b0, b3-b5 and the reference broadcast program a1 have no overlap play time periods; the broadcast programs b1 and b2 respectively have the overlap play time periods b11 and b12 with the reference broadcast program a1; it is assumed that the play time period of the reference broadcast program a1 is 3:40 PM-4:25 PM, the play time period of the broadcast program b1 is 3:30 PM-4:10 PM, and the play time period of the broadcast program b2 is 4:10 PM-4:45 PM, so that the lengths of the overlap play time periods of the broadcast programs b1 and b2 and the reference broadcast program a1 are respectively calculated as b11=30 min (3:40 PM-4:10 PM), and b12=15 min (4:10 PM-4:25 PM).

Then, it is determined that the overlap play time period b11 of the broadcast program b1 and the reference broadcast program a1 is the longest, so that the index value b1 of the broadcast program b1 is returned. As shown in FIG. 7A, the new position of the focus movement is identified that the line number is automatically added by 1 and changed to Dc b, and the index value is b1, thus controlling the focus to move to the broadcast program b1 corresponding to the new position. Meanwhile, the line number to which the broadcast program with the current focus and stored in the global variable channel index is updated with Dc b, and the index value, which is stored in the global variable program index, of the broadcast program with the current focus is updated with b1.

When the focus holds on the broadcast program b1, and the user continues to press the down key on the remote controller once, the broadcast programs c0-c6 in the channel with the line number Dc c are traversed in chronological order, and the lengths of the overlap time periods of the play time periods of the broadcast programs c0-c6 and the play time period of the reference broadcast program a1 are calculated according to the line number Dc a to which the reference broadcast program belongs and the index value a1 of the reference broadcast program stored in the global variable lastFocusProgram. For example, the broadcast programs c0, c2-c6 and the reference broadcast program a1 have no overlap play time periods; the broadcast programs c1 and c2 respectively have the overlap play time periods c11 and c12 with the reference broadcast program a1; it is assumed that the play time period of the reference broadcast program a1 is 3:40 PM-4:25 PM, the play time period of the broadcast program c1 is 3:25 PM-4:18 PM, and the play time period of the broadcast program c2 is 4:18 PM-4:35 PM, so that the lengths of the overlap play time periods of the broadcast programs c1 and c2 and the reference broadcast program a1 are respectively calculated as c11=38 min (3:40 PM-4:18 PM), and c12=7 min (4:18 PM-4:25 PM).

Then, it is determined that the overlap play time period c11 of the broadcast program c1 and the reference broadcast program a1 is longer, so that the index value c1 of the broadcast program c1 is returned. As shown in FIG. 7B, the new position of the focus movement is identified that the line number is automatically added by 1 and changed to Dc c, and the index value is c1, thus controlling the focus to move to the broadcast program c1 corresponding to the new position. Meanwhile, the line number to which the broadcast program with the current focus belongs and stored in the global variable channel index is updated with Dc c, and the index value, which is stored in the global variable program index, of the broadcast program with the current focus is updated with c1.

When the focus holds on the broadcast program c1, and the user continues to press the down key on the remote controller once, the broadcast programs d0-d8 in the channel with the line number Dc d are traversed in the chronological order, and the lengths of the overlap time periods of the play time periods of the broadcast programs d0-d8 and the play time period of the reference broadcast program a1 are calculated according to the line number Dc a to which the reference broadcast program belongs and the index value a1 of the reference broadcast program stored in the global variable lastFocusProgram. For example: the broadcast programs d0, d4-d8 have no overlap play time periods with the reference broadcast program a1, and the broadcast programs d1, d2 and d3 respectively have overlap play time periods d11, d12 and d13 with the reference broadcast program a1.

Since it is determined that d12>d13>d11, it is determined that the overlap play time period d12 of the broadcast program d2 and the reference broadcast program a1 is the longest, and the index value d2 of the broadcast program d2 is returned. As shown in FIG. 7C, the new position of the focus movement is identified that the line number is automatically added by 1 and changed to Dc d, and the index value is d2, thus controlling the focus to move to the broadcast program d2 corresponding to the new position. Meanwhile, the line number to which the broadcast program with the current focus belongs and stored in the global variable channel index is updated with Dc d, and the index value, which is stored in the global variable program index, of the broadcast program with the current focus is updated with d2.

When the focus holds on the broadcast program d2, and the user continues to press the down key on the remote controller once, the broadcast programs e0-e7 in the channel with the line number Dc e are traversed in chronological order, and the lengths of the overlap time periods of the play time periods of the broadcast programs e0-e7 and the play time period of the reference broadcast program a1 are calculated according to the line number Dc a to which the reference broadcast program belongs and the index value a1 of the reference broadcast program stored in the global variable lastFocusProgram. For example: the broadcast programs e0-e2, e5-e7 have no overlap play time periods with the reference broadcast program a1, and the broadcast programs e3 and e4 respectively have overlap play time periods e11 and e12 with the reference broadcast program a1.

Since it is determined that e11 is greater than e12, it is determined that the overlap play time period e11 of the broadcast program e3 and the reference broadcast program a1 is the longest, and the index value e3 of the broadcast program e3 is returned. As shown in FIG. 7D, the new position of the focus movement is identified that the line number is automatically added by 1 and changed to Dc e, and the index value is e3, thus controlling the focus to move to the broadcast program e3 corresponding to the new position. Meanwhile, the line number to which the broadcast program with the current focus belongs and stored in the global variable channel index is updated with Dc e, and the index value, which is stored in the global variable program index, of the broadcast program with the current focus is updated with e3.

In some embodiments, when the focus holds on the broadcast program e3, and the user presses the up key on the remote controller in sequence, similarly, the focus is controlled to move to the broadcast programs d2 (as shown in FIG. 7C), c1 (as shown in FIG. 7B), and a1 (as shown in FIG. 4).

As shown in FIG. 7E, a path of downward movement of the focus is: a1-b1-c1-d2-e3, and a path of upward movement of the focus is: e3-d2-c1-b1-a1. It can be seen from this that on one hand, in the upward movement path of the focus and the downward movement path of the focus, the broadcast program where the focus holds and the reference broadcast program basically have no offset in the left-right direction, thereby ensuring that the focus moves within a convergence range that meets the expectations of the user to the maximum extent; on the other hand, the upward movement path and the downward movement path of the focus are opposite, thus ensuring that the movement path of the focus is traceable and enhancing the user experience.

In some other embodiments, when the focus holds on the broadcast program e3, and the user presses a left key on the remote controller once, as shown in FIG. 7F, the new position of the focus movement is identified that the line number (channel index) is still Dc e, and the index value is automatically subtracted by 1 and changed to e2, that is, the focus moves to the broadcast program e2 corresponding to the new position, and the index value, which is stored in the global variable program index, of the broadcast program with the current focus is updated with e2. At the same time, the broadcast program e2 is updated with the reference broadcast program, and the line number Dc e to which the reference broadcast program e2 belongs and the index value e2 of the reference broadcast program e2 are stored in the global variable lastFocusProgram as the position of the reference broadcast program.

Then, when the focus holds on the broadcast program e2, and the user presses the up key on the remote controller once, the broadcast programs d0-d8 in the channel with the line number Dc d are traversed in the chronological order, and the lengths of the overlap time periods of the play time periods of the broadcast programs d0-d8 and the play time period of the reference broadcast program a1 are calculated according to the line number Dc a to which the reference broadcast program belongs and the index value a1 of the reference broadcast program stored in the global variable lastFocusProgram. For example: the broadcast programs d2-d8 have no overlap play time periods with the reference broadcast program e2, and the broadcast programs d0 and d1 respectively have overlap play time periods d11 and d12 with the reference broadcast program e2.

Since it is determined that d11 is greater than d12, it is determined that the overlap play time period d11 of the broadcast program d0 and the reference broadcast program e2 is the longest, and the index value d0 of the broadcast program d0 is returned. As shown in FIG. 7G; the new position of the focus movement is identified that the line number is automatically subtracted by 1 and changed to Dc d, and the index value is d0, thus controlling the focus to move to the broadcast program d0 corresponding to the new position. Meanwhile, the line number to which the broadcast program with the current focus belongs and stored in the global variable channel index is updated with Dc d, and the index value, which is stored in the global variable program index, of the broadcast program with the current focus is updated with d0.

When the focus holds on the broadcast program d0, and the user continues to press the up key on the remote controller once, the broadcast programs c0-c6 in the channel with the line number Dc c are traversed in the chronological order, and the lengths of the overlap time periods of the play time periods of the broadcast programs c0-c6 and the play time period of the reference broadcast program a1 are calculated according to the line number Dc a to which the reference broadcast program belongs and the index value a1 of the reference broadcast program stored in the global variable lastFocusProgram. For example: the broadcast programs c2-c6 have no overlap play time periods with the reference broadcast program e2, and the broadcast programs c0 and c1 respectively have overlap play time periods c11 and c12 with the reference broadcast program e2.

Since it is determined that c12 is greater than c11, it is determined that the overlap play time period c12 of the broadcast program c1 and the reference broadcast program e2 is the longest, and the index value c1 of the broadcast program c1 is returned. As shown in FIG. 7H, the new position of the focus movement is identified that the line number is automatically subtracted by 1 and changed to Dc c, and the index value is c1, thus controlling the focus to move to the broadcast program c1 corresponding to the new position. Meanwhile, the line number to which the broadcast program with the current focus belongs and stored in the global variable channel index is updated with Dc c, and the index value, which is stored in the global variable program index, of the broadcast program with the current focus is updated with c1.

The above processes are repeatedly performed, so as to realize the movement of the focus in the EPG user interface.

In the above examples, when the focus moves up and down, whether the overlap time period of the play time period of a certain broadcast program in the target television channel and the play time period of the reference broadcast program is the longest may be determined according to the position of the reference broadcast program, so as to determine the new position of the focus movement. In this way, when moving up and down at each time, the focus moves with reference to the position of the same reference broadcast program, which may prevent the focus from generating a relatively large offset in the left-right direction during the movement and cause the focus movement to tend to converge conveniently. Since the position of the reference broadcast program is kept unchanged, the upward movement path and the downward movement path of the focus are opposite, thereby solving the problem that the focus in the EPG user interface may not be backtracked when moving up and down, and enhancing the user experience.

It should be understood that in various embodiments of the present disclosure, the arrangement order of the above various processes do not necessarily mean the order of execution. The order of execution of the various processes shall be determined by their functions and an internal logic, and shall not constitute any limitations to the implementation processes of the embodiments of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device, comprising:
a display screen;
a memory, configured to store computer instructions and data associated with the display screen; and
a processor, in communication with the memory and the display screen, wherein the processor is configured to execute the computer instructions to cause the display device to:
display a television broadcast program on the display screen;
receive a first instruction for displaying an electronic program guide (EPG) user interface;
in response to the first instruction, display the EPG user interface on the display screen, wherein the EPG user interface comprises a two-dimensional program menu including television channels along a vertical direction and play times in a chronological order along a horizontal direction;
while a focus is on a first television broadcast program in a first television channel, receive a first direction instruction for indicating moving the focus along a first direction of the vertical direction, wherein a play time of the first television broadcast program in the first television channel is presented on the EPG user interface according to a play duration of the first television broadcast program;
in response to the first direction instruction, control the focus to move to a second television broadcast program in a second television channel, wherein an overlap time between a play time of the second television broadcast program and the play time of the first television broadcast program is the greatest among an overlap time between a play time of any television broadcast program in the second television channel and the play time of the first television broadcast program, and a play duration of the second television broadcast program in the second television channel is different from the play duration of the first television broadcast program in the first television channel;
while the focus is on the second television broadcast program, receive a second direction instruction for indicating moving the focus along the first direction of the vertical direction; and
in response to the second direction instruction, control the focus to move to a third television broadcast program in a third television channel, wherein an overlap time between a play time of the third television broadcast program and the play time of the first television broadcast program is the greatest among an overlap time between a play time of any television broadcast program in the third television channel and the play time of the first television broadcast program, and play duration of the third television broadcast program in the third television channel is different from the play duration of the first television broadcast program in the first television channel;
wherein the processor is further configured to execute the computer instructions to cause the display device to control the focus to move to a second television broadcast program in a second television channel by:
traversing each television broadcast program in the second television channel, and searching the second television broadcast program in the second television channel; and
calculating a new position of the focus according to a channel index and a program index of the second television broadcast program, and controlling the focus to move to the second television broadcast program corresponding to the new position.

2. The display device according to claim 1, wherein the processor is further configured to execute the computer instructions to cause the display device to:
while the focus is on the third television broadcast program, receive a third direction instruction for indicating moving the focus along a first direction of the horizontal direction;
in response to the third direction instruction, control the focus to move to a fourth television broadcast program in the third television channel, wherein the fourth television broadcast program is different from the third television broadcast program;
receive a fourth direction instruction configured for indicating moving the focus along the first direction of the vertical direction while the focus is on the fourth television broadcast program; and
in response to the fourth direction instruction, control the focus to move to a fifth television broadcast program in a fourth television channel, wherein an overlap time between a play time of the fifth television broadcast program and a play time of the fourth television broadcast program is the greatest among an overlap time between a play time of any television broadcast program in the fourth television channel and the play time of the fourth television broadcast program.

3. The display device according to claim 1, wherein the processor is further configured to execute the computer instructions to cause the display device to:
while the focus is on the third television broadcast program, receive a fifth direction instruction for indicating moving the focus along a second direction of the vertical direction opposite to the first direction of the vertical direction; and in response to the fifth direction instruction, control the focus to move from the third television broadcast program to the second television broadcast program.

4. The display device according to claim 3, wherein the processor is further configured to execute the computer instructions to cause the display device to:

while the focus is on the second television broadcast program, receive a seventh direction instruction for indicating moving the focus along the second direction of the vertical direction; and in response to the seventh direction instruction, control the focus to move from the second television broadcast program to the first television broadcast program.

5. The display device according to claim 2, wherein the processor is further configured to execute the computer instructions to cause the display device to:

while the focus is on the fifth television broadcast program, receive a sixth direction instruction for indicating moving the focus along a second direction of the vertical direction opposite to the first direction of the vertical direction; and in response to the sixth direction instruction, control the focus to move from the fifth television broadcast program to the fourth television broadcast program.

6. The display device according to claim 1, wherein the processor is further configured to execute the computer instructions to cause the display device to:

extract EPG information from additional information comprised in a broadcast signal; and generate an EPG user interface based on the EPG information.

7. The display device according to claim 6, wherein the EPG information comprises at least one of a name, a type, a start time or an end time.

8. A method for controlling focus movement on an electronic program guide (EPG) user interface in a display device, comprising:

displaying a television broadcast program on a display screen of the display device;

receiving a first instruction for displaying the EPG user interface;

in response to the first instruction, displaying the EPG user interface on the display screen, wherein the EPG user interface comprises a two-dimensional program menu including television channels along a vertical direction and play times in a chronological order along a horizontal direction;

while a focus is on a first television broadcast program in a first television channel, receiving a first direction instruction for indicating moving the focus along a first direction of the vertical direction, wherein a play time of the first television broadcast program in the first television channel is presented on the EPG user interface according to a play duration of the first television broadcast program;

in response to the first direction instruction, controlling the focus to move to a second television broadcast program in a second television channel, wherein an overlap time between a play time of the second television broadcast program and the play time of the first television broadcast program is the greatest among an overlap time between a play time of any television broadcast program in the second television channel and the play time of the first television broadcast program, and a play duration of the second television broadcast program in the second television channel is different from the play duration of the first television broadcast program in the first television channel;

while the focus is on the second television broadcast program, receiving a second direction instruction for indicating moving the focus along the first direction of the vertical direction; and in response to the second direction instruction, controlling the focus to move to a third television broadcast program in a third television channel, wherein an overlap time between a play time of the third television broadcast program and the play time of the first television broadcast program is the greatest among an overlap time between a play time of any television broadcast program in the third television channel and the play time of the first television broadcast program, and a play duration of the third television broadcast program in the third television channel is different from the play duration of the first television broadcast program in the first television channel;

wherein the controlling the focus to move to a second television broadcast program in a second television channel comprises:

traversing each television broadcast program in the second television channel, and searching the second television broadcast program in the second television channel; and calculating a new position of the focus according to a channel index and a program index of the second television broadcast program, and controlling the focus to move to the second television broadcast program corresponding to the new position.

9. The method according to claim 8, further comprising:

while the focus is on the third television broadcast program, receiving a third direction instruction for indicating moving the focus along a first direction of the horizontal direction;

in response to the third direction instruction, controlling the focus to move to a fourth television broadcast program in the third television channel, wherein the fourth television broadcast program is different from the third television broadcast program;

receiving a fourth direction instruction configured for indicating moving the focus along the first direction of the vertical direction while the focus is on the fourth television broadcast program; and in response to the fourth direction instruction, controlling the focus to move to a fifth television broadcast program in a fourth television channel, wherein an overlap time between a play time of the fifth television broadcast program and a play time of the fourth television broadcast program is the greatest among an overlap time between a play time of any television broadcast program in the fourth television channel and the play time of the fourth television broadcast program.

10. The method according to claim 8, further comprising:

while the focus is on the third television broadcast program, receiving a fifth direction instruction for indicating moving the focus along a second direction of the vertical direction opposite to the first direction of the vertical direction; and in response to the fifth direction instruction, controlling the focus to move from the third television broadcast program to the second television broadcast program.

11. The method according to claim 10, further comprising:
- while the focus is on the second television broadcast program, receiving a seventh direction instruction for indicating moving the focus along the second direction of the vertical direction; and
- in response to the seventh direction instruction, controlling the focus to move from the second television broadcast program to the first television broadcast program.

12. The method according to claim 9, further comprising:
- while the focus is on the fifth television broadcast program, receiving a sixth direction instruction for indicating moving the focus along a second direction of the vertical direction opposite to the first direction of the vertical direction; and
- in response to the sixth direction instruction, controlling the focus to move from the fifth television broadcast program to the fourth television broadcast program.

13. The method according to claim 8, further comprising:
- extracting EPG information from additional information comprised in a broadcast signal; and
- generating an EPG user interface based on the EPG information.

14. The method according to claim 13, wherein the EPG information comprises at least one of a name, a type, a start time or an end time.

* * * * *